June 17, 1969 R. E. SENDELBACH 3,450,119
AIR CLEANER AIR INLET CONSTRUCTION
Filed Aug. 28, 1967 Sheet 1 of 2

INVENTOR.
Ralph E. Sendelbach
BY John R. Faulkner
Robert E. McCollum
ATTORNEYS

INVENTOR.
Ralph E. Sendelbach
BY John R. Faulkner
Robert E. McCollum
ATTORNEYS.

United States Patent Office 3,450,119
Patented June 17, 1969

3,450,119
AIR CLEANER AIR INLET CONSTRUCTION
Ralph E. Sendelbach, Birmingham, Mich., assignor to Ford Motor Company, Dearborn, Mich., a corporation of Delaware
Filed Aug. 28, 1967, Ser. No. 663,801
Int. Cl. F02m 35/04
U.S. Cl. 123—122                 3 Claims

ABSTRACT OF THE DISCLOSURE

An air inlet duct having an ambient air inlet and a branch exhaust manifold heated air inlet, flow into the duct from the inlets being proportioned by a gate valve pivotally mounted at the junction between the two and controlled, first, by a temperature responsive element that below a predetermined temperature moves the valve towards an ambient air inlet closed position, and above a predetermined air temperature closes the hot air inlet; and, secondly, by an engine intake manifold vacuum controlled servo that overrides the temperature responsive element at high engine loads or low vacuum conditions to close the hot air duct to minimize air flow restriction into the air cleaner.

---

This invention relates, in general, to an internal combustion engine. More particularly, it relates to the construction of an air inlet duct for the air cleaner of an internal combustion engine.

For cold weather operation of a motor vehicle type engine, it is desirable to heat the air entering the carburetor to a predetermined level so that it will permit a rapid vaporization of the fuel that is mixed with it, not only to provide more complete burning of the fuel, but also to reduce fuel consumption. Many vehicles have air cleaners with snorkel type air inlet ducts that have both an ambient air temperature inlet and an exhaust manifold stove heated air inlet branch. Generally, flow is proportioned by a temperature responsive element that either permits the flow of all ambient air, a mixture of ambient and hot air, or hot air alone, as a function of the air cleaner air inlet temperature.

In a construction of this kind, however, the restriction to flow caused by the close spacing of the heat stove shroud around the exhaust manifold pipe can severely impede engine performance at low temperatures by not providing sufficient air flow to the carburetor under high load operating conditions.

It is an object of the invention, therefore, to provide an air cleaner air inlet duct construction that normally maintains the carburetor inlet air at a minimum temperature, but, however, provides a temperature override control to automatically satisfy carburetor inlet air requirements if the air flow as controlled by the temperature control is insufficient.

It is a further object of the invention to provide an air cleaner air inlet duct construction with a vacuum controlled servo operatively connected to a gate valve that proportions flow between the hot air and ambient temperature air duct portions; the servo being responsive to engine high power operating conditions to automatically close the hot air duct while opening wide the ambient temperature air duct independently of the control of the gate valve by a thermally responsive element that normally proportions flow in response to air temperatures alone.

Another object of the invention is to provide an air inlet duct construction of the type described above in which the thermally responsive element is of the linear expandable-contractible type, and has a lost motion connection with the flow proportioning gate valve, and the servo override control also has a lost motion connection with the gate valve.

Other objects, features and advantages of the invention will become more apparent upon reference to the succeeding detailed description thereof, and to the drawings illustrating the preferred embodiments thereof, wherein.

Figure 1:
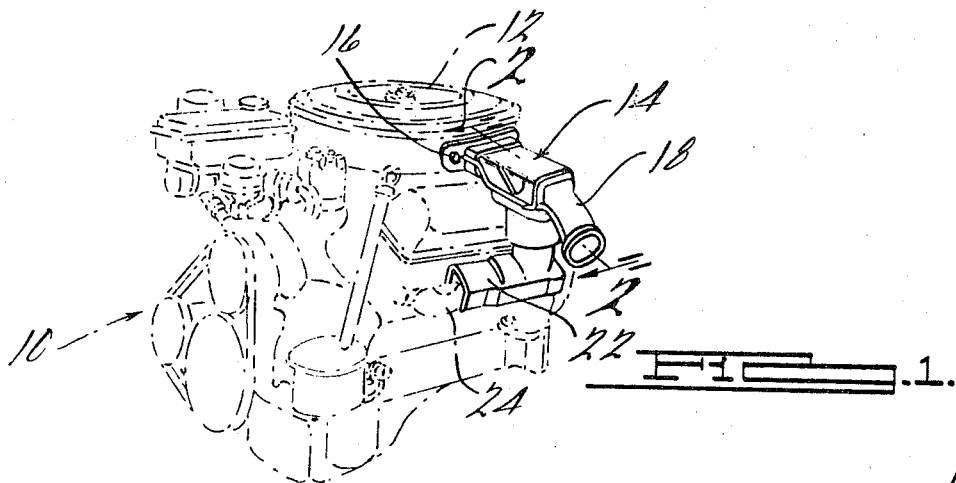
FIGURE 1 is a phantom perspective view of an internal combustion engine having an air cleaner air inlet duct embodying the invention.

FIGURE 1 shows in a phantom view a conventional internal combustion engine 10 of the V-type to which is attached a carburetor (not shown) that provides a mixture of air and fuel to the intake manifold. Positioned over and secured to the carburetor inlet, for air filtering and sound attenuating purposes, is a conventional dry element type air cleaner 12 that has a snorkel-like air inlet duct 14 of a construction embodying the invention. The inlet, which is open at both ends, is secured at one end to the air cleaner housing by bolts 16, and at its opposite end is fittted with an essentially tubular ambient temperature air inlet adapter 18. The latter directs air from the engine compartment into the air cleaner during the compression stroke of the engine.

The bottom of duct 14 has an opening in which is received the upper end of a branch duct 20. At its lower end, duct 20 is formed with a channel-like shroud 22 that closely surrounds the engine exhaust manifold pipe 24, but is spaced sufficiently from it to permit the passage of engine compartment air into the interior of the shroud and up through pipe 20 into inlet duct 14. The clearance between the shroud and the manifold is such as to satisfy air cleaner air flow requirements during closed and part throttle operations of the engine, while at the same time providing sufficient heat transfer from the hot manifold to the air to warm this air to a temperature sufficiently to vaporize the carburetor fuel upon its mixing with the air.

As will be described in more detail later, an arcuatably movable gate valve or door (FIGURE 2) is pivotally mounted on the inlet duct 14 at the junction between the hotter air and ambient air inlet portions, and is movable in response to predetermined air temperatures to proportion the flow of the two air supplies to the air cleaner.

Figure 2:
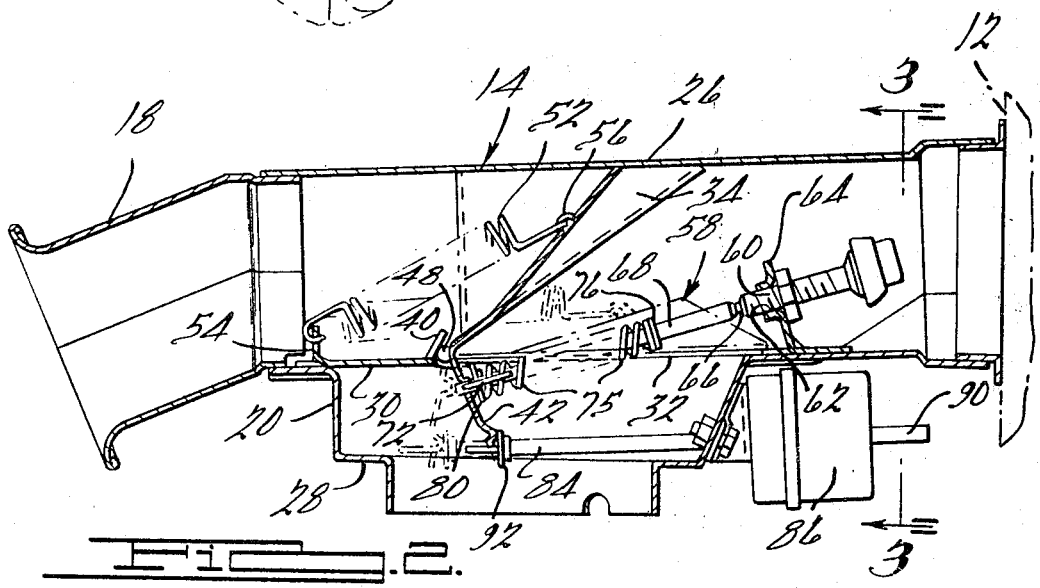
FIGURE 2 is an enlarged cross-sectional view of the inlet duct shown in FIGURE 1, taken on a plane indicated by and viewed in the direction of the arrows 2—2 of FIGURE 1.
Figure 3:
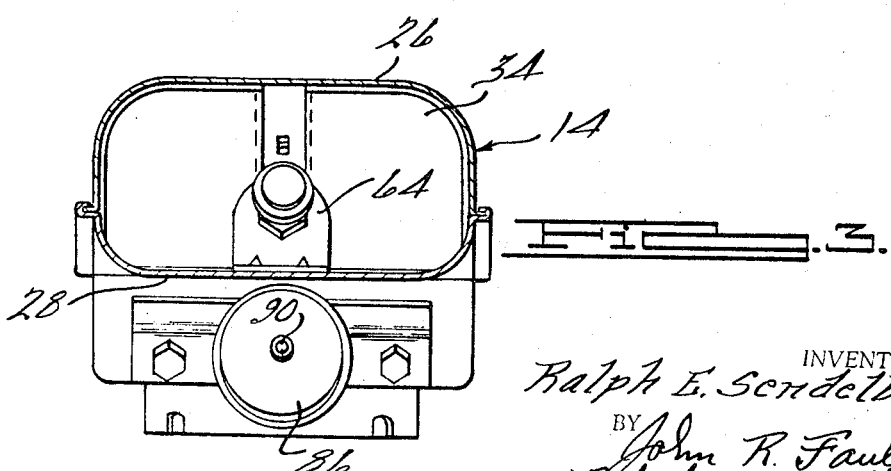
FIGURE 3 is an end cross-sectional view taken on a plane indicated by and viewed in the direction of the arrows 3—3 of FIGURE 2.
Figure 4:
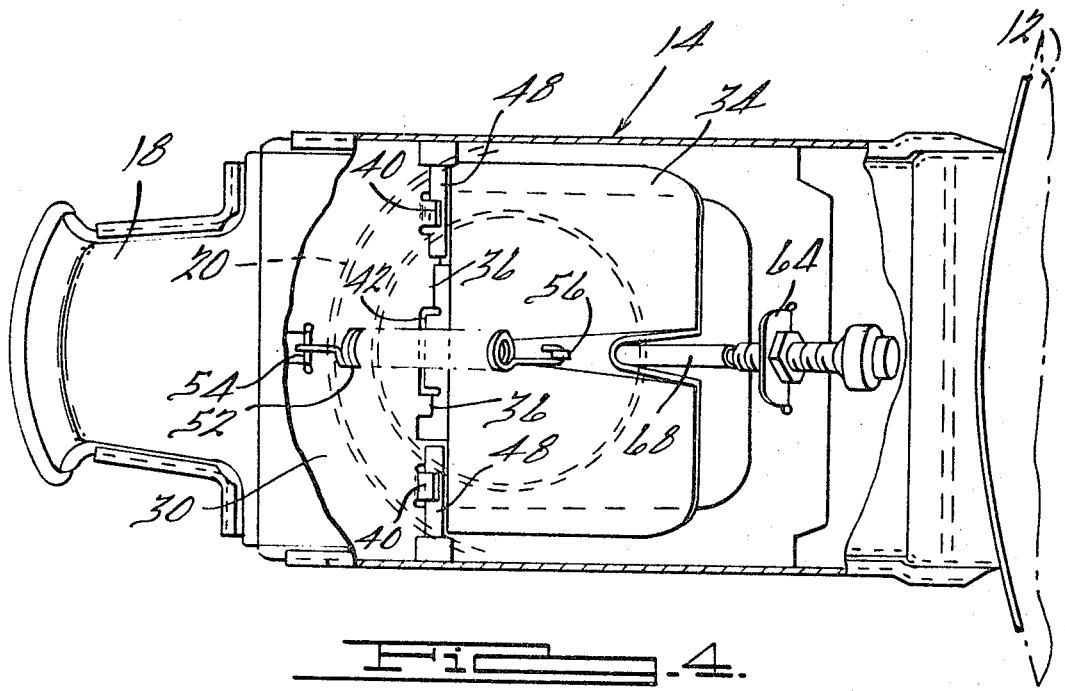
FIGURE 4 is a top or plan view, with parts broken away and in section, of the construction illustrated in FIGURE 2.

Referring now more specifically to FIGURES 2, 3 and 4, inlet duct 14 consists of an upper inverted U-shaped shell 26, a lower shell portion 28 that is formed with the tubular hot air opening, and an intermediate plate 30 having large opening 32 for the flow of hot air from duct 20 into the main portion of duct 14. The upper and lower shells 26 and 28 and intermediate plate 30 are each provided with suitable flanges, as best seen in FIGURE 3, that are crimped together upon assembly to form an integral unit.

A flow proportioning door or gate valve 34 is pivotally secured to intermediate plate 30 in the manner shown so as to be movable to fully close opening 32, in the dotted line extreme position, or fully close the ambient temperature air inlet 18, in the full line extreme position shown.

As best seen in FIGURE 1, the sides of the upper shell 26 are embossed to provide suitably shaped internal ridges that cooperate with the edges of the door 34 in a manner to provide an effective closing of the ambient temperature air inlet duct portion 18.

Figure 5:
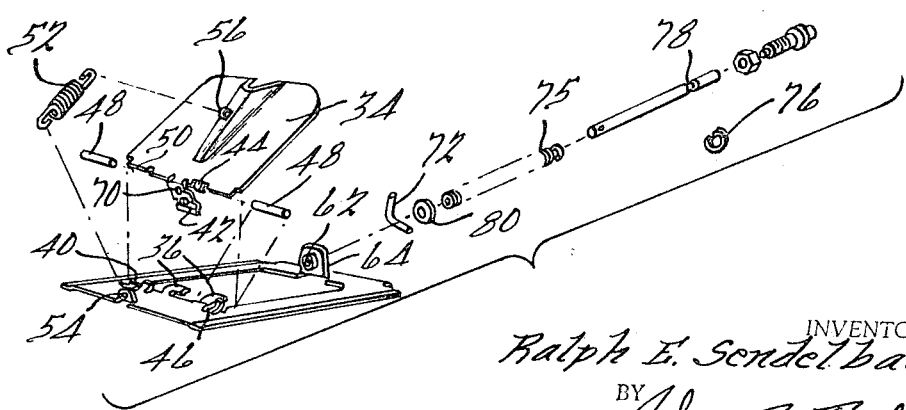
FIGURE 5 is a perspective view of a sub-assembly illustrated in FIGURE 2.

As best seen in FIGURE 5, plate 30 is provided with a plurality of mounting tangs that cooperate with oppositely bent tang portions on door 34, and pins to provide a hinging action for the door. More specifically, intermediate plate 30 has two spaced tab projections 36, each with a central half-round-like depression 38, and two upturned tangs 40. Door 34, on the other hand, has a central flange 42 that projects downwardly essentially at right angles through the sapce between plate projections 36. Door 34 further has a bent tang 44, which when assembled to plate 30, projects through a slot or opening 46 in plate projection 36 to retain the door to plate 30. The hinge action is further afforded by a pair of hinge pins 48 secured between the outermost edge portions 50 of door 34 and the upturned tangs 40 of plate 30.

Door 34 is normally biased to the full line position shown in FIGURE 2 by a spring 52 that is secured at one end in an eyelet 54 on plate 30 and at its other end in an eyelet 56 projecting from door 34. The door is arcuately swingable, progressively, in response to predetermined temperature changes of the air entering duct 14, by an expandable-contractible, thermally responsive, push-pull linkage assembly indicated in general at 58 in FIGURES 2 and 4. A thermally responsive element is movable within a screw casing 60 mounted through an opening 62 of a flange 64 secured to plate 30. This latter element may be of a known type, such as a wax or similar pellet, that expands and contracts in a linear manner in response to changes in temperature from a predetermined set level. The thermally responsive element moves the reduced end 66 of a plunger or shaft 68, the end being slidably received in the screw sleeve 60. The lower portion of shaft 68 projects through an opening 70 (FIGURE 5) in the door flange 42, and is held or fixed to it by an L-shaped cotter pin 72 insertable through a hole 74 in the end of shaft 68. The shaft is biased to the right against the thermally responsive element by a spring 75 that slidably surrounds the shaft. The spring seats at one end against a retainer ring 76 fixed on shaft 68 in a groove 78, and at its other end against a washer 80 that is slidably mounted between the end of the spring and the door flange 42.

A further hole or aperture 82 is provided in door flange 42 for slidably receiving the movable stem 84 of a vacuum controlled servo unit 86. The details of construction of the servo unit per se are known and, therefore, are not given since they are believed to be unnecessary for an understanding of the invention. Suffice it to say, however, that it would be of a type, for example, having a diaphragm attached to stem 84 and biased to the left by a suitably preloaded spring, and moved to the right against the force of the spring by vacuum at a suitable level. In this case, the servo has a duct or passage 90 that is adapted to be connected to the intake manifold of the internal combustion engine shown in FIGURE 1. The force of the spring in the servo would be chosen such that stem 84 would not be moved to the left sufficient to move door flange 42 from the full to the dotted line position shown in FIGURE 2 until the decrease in engine intake manifold vacuum reached a level corresponding to that indicating essentially full power operating condition of the engine; that is, until the intake manifold vacuum decayed to a level below, say, 8 inches of mercury, for example, in a case where the maximum normal vacuum at engine idle may be 25 inches of mercury.

The servo housing is fixed to a plate that is connected by screws to a portion of lower shell 28, as shown. The left end of stem 84 has a smaller diameter portion on which is slidably mounted a washer 92 that is located axially against the shoulder joining the two diameters of the stem.

Operation

Assume, for example, that it is desired to control the temperature of the air entering the air cleaner to be between 90 and 140 degrees Fahrenheit. The temperature responsive pellet moving stem 66, therefore, will be chosen to move between its extreme movements when the air temperature is within this range. At below 90 degrees, the wax pellet will have contracted sufficiently so as to exert essentially no force on shaft 68, and the force of spring 52 will move the door 34 to the position shown in full in FIGURE 2. The spring 75 surrounding shaft 68 will exert a force against the washer or retainer 76 sufficiently to merely abut the shaft against the end of the pellet.

When the air temperature rises above 90 degrees, the wax pellet will begin to expand and thereby exert a linear force against shaft 68 and attempt to pivot door 34 against the force of spring 52. At this time, there is a solid connection between the wax pellet, stem 66, shaft 68, and flange 42 of door 34, so that the door is progressively moved from the full line towards the dotted line positions shown in FIGURE 2 as the temperature increases towards 140 degrees. At 140 degrees, door 34 will have been moved to completely close off the hot air duct or opening 32, thereby causing all of the air flowing to the air cleaner 12 to be ambient temperature air passing from duct 18. Conversely, if the temperature of the incoming air should decrease below 140 degrees, the pellet will react accordingly to progressively contract and permit spring 52 to again progressively open the hot air opening 32 to any desired amount while closing or partially closing the ambient temperature air inlet.

Regardless of the position of door 34, as determined by the temperature of the air, if sudden acceleration is called for, such as full throttle operation of the engine indicating full power demand, the immediate sudden decrease in intake manifold vacuum is reflected in servo passage 90 to thereby permit the spring therein to move stem 84 to the left from the full line to the dotted line positions indicated. The force of the spring of the servo will be of a value sufficient to overcome the force of spring 52 to fully close the hot air opening 32. The closing movement of door 34 is made possible independent of the position called for by the wax pellet because of the lost motion type of connection of shaft 68 within the screw casing 60, and the connection of spring 75 to the door flange 42. That is, leftward movement of flange 42 can now pull the sleeve leftwardly to slide free of contact with the wax pellet in casing 60, and against the force of spring 75 simply by compressing the spring. The compression of spring 75, of course, provides a modulating action to the closing movement of door 34.

From the foregoing, therefore, it will be seen that the invention provides an air cleaner air inlet duct construction that permits controlling the temperature of the air entering the air cleaner during normal closed or part throttle engine operating conditions, while permitting a relatively unrestricted air flow of ambient temperature air into the air cleaner at full load engine operating conditions regardless of the air temperature. It will also be seen that the above is accomplished through the use of a simple yet efficient and quickly responsive servo element that senses the operating condition of the engine to satisfy engine air flow requirements.

While the invention has been shown in its preferred embodiment in the drawings, it will be clear to those skilled in the arts to which it pertains that many changes and modifications may be made thereto without departing from the scope of the invention.

I claim:

1. An air cleaner air inlet duct assembly for use with an internal combustion engine having an intake manifold providing a source of vacuum varying with load and speed conditions of operation of said engine, said assembly comprising, a longitudinally extending duct having a first-ambient air temperature inlet conduit at one end and an air outlet opening into an air cleaner housing at the opposite end, a second branch air inlet connected to and opening into said duct adjacent said first inlet and containing air at a temperature higher than ambient, gate means pivotally mounted on said duct and movable alternately between first and second positions closing said first inlet while opening said second, and vice versa, spring means biasing said gate to said first position, longitudinally expandable-contractible temperature responsive means mounted in said duct adjacent said outlet and connected to said gate for movement thereof between said first and second positions in response to the attainment of predetermined temperatures of the air in said duct adjacent said outlet, and intake manifold vacuum responsive overcontrol means operatively connected to said gate in parallel relationship with respect to said temperature responsive means and responsive to a predetermined vacuum level of said engine for moving said gate to said second position regardless of the position called for by said temperature responsive means, the connections of said temperature responsive means and said overcontrol means to said gate each including a lost motion connector, said gate having an actuating flange depending therefrom and fixed thereto, said vacuum responsive means comprising a vacuum servo connected to said intake manifold vacuum and having a linearly movable actuator spring biased in one direction, said overcontrol means lost motion means comprising means on said actuator abuttable against said flange in said one direction of movement of said actuator to move said flange in said one direction to thereby move said gate to said second position upon a predetermined decrease in the intake manifold vacuum.

2. An assembly as in claim 1, said lost motion connection between said temperature responsive means and said gate comprising a telescoping link having spring means between telescoping portions thereon yieldably interconnecting said portions.

3. An assembly as in claim 1, said actuator being slidably engaged with said flange permitting movement of said flange in one direction relative to said actuator, said lost motion means abuttable with said flange being fixed to said actuator and abuttable against one side of said flange upon a predetermined sliding movement of said actuator relative to said flange.

References Cited

UNITED STATES PATENTS

| | | |
|---|---|---|
| 1,429,257 | 9/1922 | Schulz. |
| 1,448,008 | 3/1923 | Smith. |
| 2,058,204 | 10/1936 | Ball et al. |
| 2,781,032 | 2/1957 | Sebok et al. |
| 2,839,039 | 6/1958 | Obermaier. |
| 2,853,065 | 9/1958 | Stearns. |

AL L. SMITH, *Primary Examiner.*